United States Patent [19]

Yerkovich

[11] Patent Number: 4,947,575
[45] Date of Patent: Aug. 14, 1990

[54] BAIT HOLDER

[76] Inventor: Nick A. Yerkovich, 7439 S. 300 East, Midvale, Utah 84047

[21] Appl. No.: 270,824

[22] Filed: Nov. 14, 1988

[51] Int. Cl.⁵ .............................................. A01K 83/06
[52] U.S. Cl. ........................................ 43/44.4; 43/44.8
[58] Field of Search ....................... 43/44.2, 44.4, 44.8, 43/44.6

[56] References Cited

U.S. PATENT DOCUMENTS

| | | | |
|---|---|---|---|
| 1,325,530 | 12/1919 | Ore | 43/44.2 |
| 2,115,493 | 4/1938 | Kosten | 43/44.8 |
| 2,454,879 | 11/1948 | Mattingly | 43/44.8 |
| 2,463,369 | 3/1949 | Finlay | 43/44.4 |
| 2,559,409 | 7/1952 | Dohmeyer | 43/44.8 |
| 2,982,049 | 5/1961 | Yost | 43/44.8 |
| 3,026,647 | 3/1962 | Rainey | 43/44.4 |
| 3,200,532 | 8/1965 | Walton | 43/44.8 |
| 3,400,484 | 9/1968 | Beard | 43/44.8 |
| 3,587,189 | 6/1971 | Kopicko | 43/44.8 |
| 4,646,464 | 3/1987 | Wyatt | 43/44.4 |
| 4,691,467 | 9/1987 | Brimmer | 43/44.8 |
| 4,785,571 | 11/1988 | Beck | 43/44.4 |

FOREIGN PATENT DOCUMENTS 2509133  1/1983  France ................................. 43/44.4

Primary Examiner—Kurt Rowan
Attorney, Agent, or Firm—J. David Nelson; Michael D. McCully

[57] ABSTRACT

A bait holder for holding live bait (e.g., an earthworm) on a fishhook comprises an arcuate or concave saddle member and a strap-like retaining member that is positioned over the bait to retain same in place. The saddle member and retaining member both include rubber sections that are resilient and have gripping surfaces that engage the bait and prevent the bait from slipping out of the holder, yet permit the bait almost total freedom of movement to wriggle about to attract fish.

14 Claims, 2 Drawing Sheets

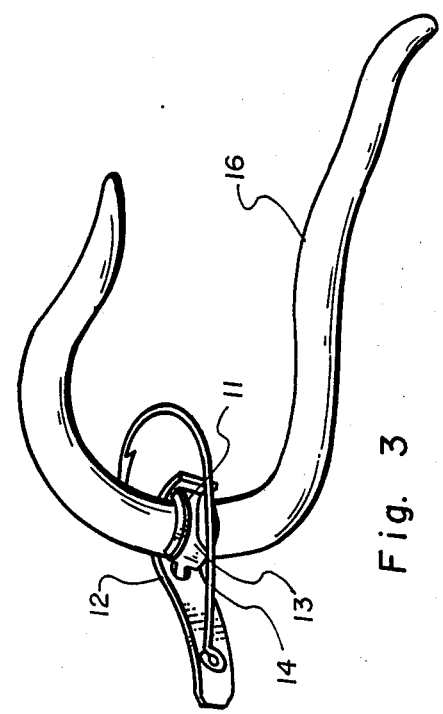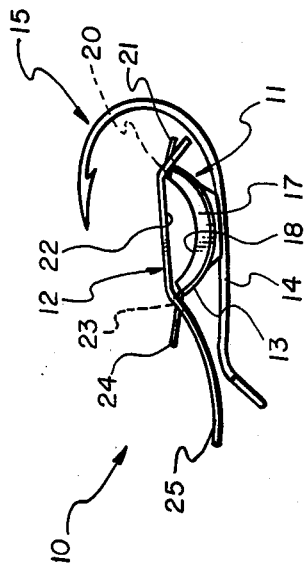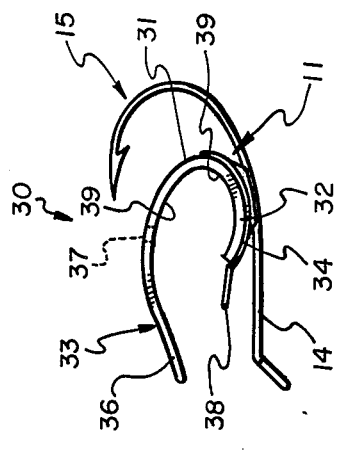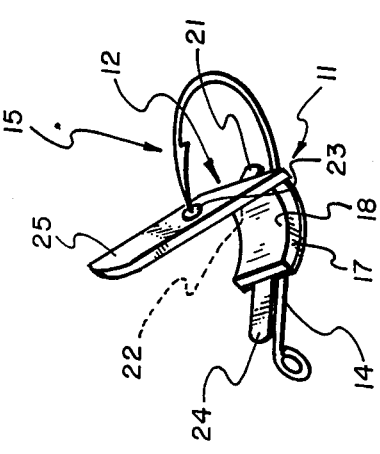

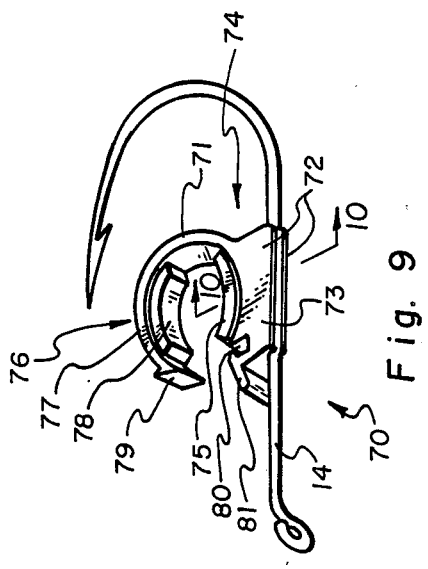
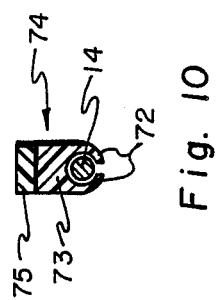
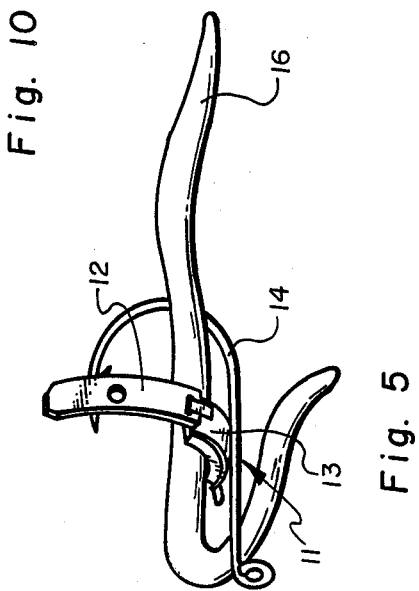
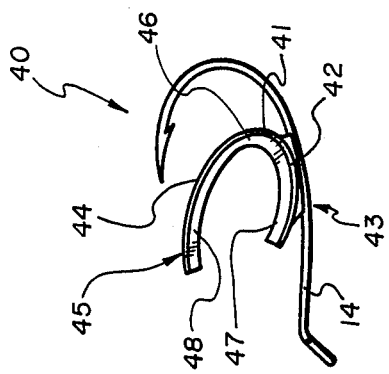
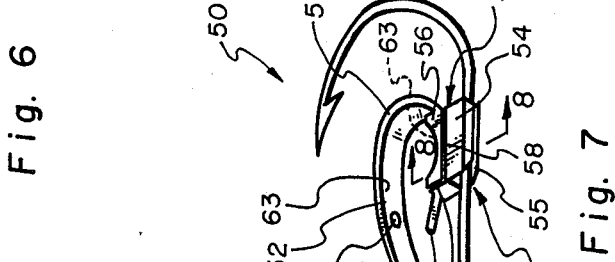
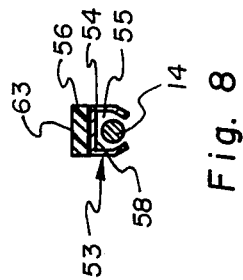

BAIT HOLDER

BACKGROUND OF THE INVENTION

The present invention pertains to bait holders for fishing hooks, and more particularly pertains to such a holder for holding live bait (e.g., an earthworm) in a manner to avoid killing the live bait prematurely.

It is well known that live bait for fishing is much superior to artificial or dead bait. A major reason for this is that live bait wriggles, squirms and otherwise moves about, thereby attracting fish. Conversely, dead and artificial bait, being motionless except for movement caused by the fisherman or by water currents, do not attract fish nearly as readily.

A number of devices are presently known that attempt to hold earthworms and/or other "live" bait. However, these known devices all hold the bait either directly against the fishhook shank, or by and against a spring wire. Of these devices, those shown in U.S. Pat. Nos. 2,115,493 and 2,454,879 hold an earthworm in a plurality of places, such that very little fish attracting movement is permitted, not to mention the fact that the worm is held by steel wire which tends to cut into the worm, thereby killing it prematurely.

U.S. Pat. No. 2,559,409 shows a device that holds a worm between the shanks of three connected hooks. It, too, tends to cut into the worm when sufficient force is applied to the shanks to retain a wriggly worm in position. U.S. Pat. No. 2,982,049 shows a device that is intended to hold live bait by means of a slip-noose of fine wire. Obviously, a fine wire slip-noose tight enough to hold a wriggling earthworm will also cut into the worm, thus rendering it lifeless and unappealing to fish.

Thus, it is a primary object of the present invention to provide a bait holder for fishing hooks that retains live bait therein without tending to cut into said bait (e.g., an earthworm), in order that said live bait may remain alive.

It is another object of the present invention to provide such a bait older that will permit said live bait to freely wriggle about in order to more readily attract fish.

SUMMARY OF THE INVENTION

These and other objects and advantages are realized by a live bait holder for fish hooks comprising a concave saddle member into which live bait is positioned and a bait retaining member that takes the form of a strap that fits over the bait and saddle member to "strap" the bait therein. The saddle member and bait retaining member include inward facing surfaces that (1) grip or grasp the live bait to keep it from wriggling free, and (2) are springy and resilient in order to avoid cutting into or otherwise injuring the live bait.

Other objects and features of the invention will become apparent from the following detailed description and drawing figures that describe and illustrate what are presently contemplated as being the best mode and alternative designs of the invention.

IN THE DRAWINGS

FIG. 1 is a front view of a preferred embodiment of the bait holder of the present invention;

FIG. 2 is perspective view of the embodiment of FIG. 1, showing the bait holder in open position;

FIG. 3 is a perspective view of the embodiment of FIGS. 1 and 2, showing an earthworm retained therein;

FIG. 4 is a front view of a second embodiment of the bait holder of the present invention;

FIG. 5 is a perspective view of a third embodiment of the bait holder of the present invention;

FIG. 6 is a front view of a fourth embodiment of the bait holder of the present invention;

FIG. 7 is a perspective view of a fifth embodiment of the bait holder of the present invention;

FIG. 8 is a vertical sectional view, taken through line 8—8 in FIG. 7;

FIG. 9 is a perspective view of a sixth embodiment of the bait holder of the present invention; and FIG. 10 is a vertical sectional view, taken through line 10–10 in FIG. 9.

DETAILED DESCRIPTION OF THE INVENTION

Turning to the drawings and initially to FIG. 1, a preferred embodiment of the bait holder of the present invention is shown, generally illustrated by the numeral 10. The bail holder 10 is shown to comprise two major elements—a saddle member 11 and a bait retaining member 12. In this embodiment, the saddle member 11 is formed of a sheet metal (e.g., thin sheet steel or tin) base 13 that is formed into essentially an arc that defines an open-ended short open channel. The saddle base 13 is soldered to the shank 14 of a typical barbed-end fishhook 15 on the "in" side of the shank. As best shown in FIG. 3, the saddle member 11 is oriented on the fishhook shank 14 such that an earthworm 16 will be held transversely relative to the shank.

As best shown in FIG. 2, the saddle member 11 is formed with a bait gripping section 17, formed of a rubber or other resilient material. The material of the bait gripping section includes a bait gripping surface 18 for gripping and retaining an earthworm thereagainst. As shown, the bait gripping section 17 is formed into an arcuate shape to fit into the open-ended channel form of the saddle base member 13, in order to more effectively "nest" and grip an earthworm placed therein.

In the embodiment shown in FIGS. 1, 2, and 3, the bait retaining member 12 takes the form of a rubber strap that is connected to the saddle member base 13 at one end, as shown. To effect this connection in this embodiment, the bait retaining member 12 is formed with a hole or slot 20 through which is inserted a strap tab 21 of the saddle member base 13. The strap tab 21 is then bent downward toward the fishhook shank in order to maintain the bait retaining member 12 essentially permanently attached to the saddle member 11.

In this embodiment, the bait retaining member of strap 12 is constructed of a rubber material that is, of course, deformable and resilient, and also includes a bait gripping surface 22 that grips onto and resists slippage or movement of an earthworm positioned thereagainst.

The bait retaining strap 12 is adapted to be hooked in a closed position (FIGS. 1 and 3) in order to "strap" a live earthworm securely into the saddle member 11. In this embodiment, the bait retaining strap 12 includes a second hole or slot 23 (the attaching hole—best shown in FIG. 2) that is adapted to be manually positioned over (around) a second strap tab (the attaching tab) 24 formed as part of the metal saddle member base 13. In this manner, the bait retaining strap 12 is easily manually stretched to be repeatedly hooked and unhooked to close/open the strap over live earthworms 16 positioned in the saddle member 11. The remaining portion of the bait retaining strap 12 beyond the strap attaching hole 23 defines a bait retaining strap handle 25 for manually gripping and positioning the bait retaining strap 12 over a live earthworm and for pulling the strap attaching hole over the saddle member attaching tab 24.

USE

Use of the bait holder of the present invention should be apparent from the description and drawings. However, the inventor has determined that it is simplest and easiest to hold the barbed end of the fishhook between the thumb and index finger of one hand while positioning an earthworm across the saddle member 12, transversely to the fishhook shank, with the other hand. The middle finger of the hand holding the fishhook should be used to hold the earthworm across the saddle member 11 until the bait retaining strap 12 is hooked into place. With his free hand (the one that placed the earthworm across the saddle member), the fisherman pulls the bait retaining strap 12 by its handle 25 to position the rubber strap attaching hole 23 over the corresponding tab 24. So positioned, the bait retaining strap will retain the live earthworm snugly and securely within the saddle member 11 as shown in FIG. 3, in a manner to permit the earthworm essentially total freedom of movement to wriggle about and attract fish.

ALTERNATIVE EMBODIMENTS

Referring now to FIG. 4, a second embodiment of the present invention is shown at 30. This second embodiment 30 is quite similar to the embodiment 10 of FIGS. 1, 2, and 3, but is different in that this embodiment 30 incorporates a single unitary rubber piece 31 that forms both the saddle member bait gripping section 32 and the entire bait retaining strap 33. As in the previously described embodiment 10, the saddle member 11 comprises a sheet metal base 34, similar to the base 13 of the first embodiment. It differs, however, in that the base 34 lacks the tab (21) of the first embodiment saddle base (FIGS. 1 and 2). The metal base 34 is soldered to the shank 14 of the fish hook 15, as in the first embodiment 10.

Rather than the two individual pieces of the first embodiment 10—the saddle member bait gripping section 17 and the bait retaining strap 12—, the second embodiment 30 of the FIG. 4 incorporates the single unitary rubber piece 31 that serves the functions of the two individual pieces. As shown, the unitary rubber piece 31 is bonded or otherwise affixed to the saddle member base 34 at one end thereof to define a bait gripping section 32 quite similar to that 17 of the first embodiment, for receiving and holding a live earthworm. The unitary rubber piece 31 extends beyond the saddle member base 34 to also form the bait retaining strap 33 and the handle 36. The unitary piece 31 also includes an attaching hole 37 for manually positioning over (around) the attaching tab 38 formed on the saddle member metal base 34.

The unitary piece 31 is constructed of a resilient rubber or plastic material which, of course, may be the same material as that of the first embodiment saddle member bait gripping section 17 and bait retaining strap 12. In any event, this unitary piece includes bait gripping surfaces 39 on the inside or inwardly facing surfaces thereof, as depicted in FIG. 4, that function in an identical manner to grip onto and resist slippage of a live earthworm positioned within the bait holder.

FIG. 5 is a perspective view of a third embodiment of the bait holder of the present invention. In this embodiment, the saddle member 11 and bait retaining strap 12 are identical to those of the first embodiment (FIGS. 1–3), and therefore, will have the same reference numerals. The difference between the first and third embodiments (FIGS. 1–3 and 5) is that the saddle member base 13 is rotated 90 degrees in one embodiment from that of the other embodiment. I.e., in the embodiment of FIGS. 1–3, the earthworm 16 is positioned to be transverse to the fishhook shank 14, whereas, in the embodiment of FIG. 5, the earthworm is positioned to be parallel with the fishhook shank.

FIG. 6 is a front view of a fourth embodiment 40 of the bait holder of the present invention. In this embodiment, one end of a continuous metal strip 41 is soldered or affixed to the fishhook shank 14 in a manner and orientation essentially identical to those shown in FIGS. 1–4, to define a base 42 for the saddle member 43. The other, "free" end of the metal strip 41 forms a support section 44 for the bait retaining member 45.

As in the embodiment of FIG. 4, this embodiment 40 incorporates a single unitary rubber piece 46 that forms both the bait gripping section 47 of the saddle member 43 and the bait gripping section 48 of the bait retaining member 45. The unitary piece 46 is constructed of a rubber material similar, but not necessarily identical, to the unitary rubber piece 31 of the embodiment of FIG. 4. It is bonded or otherwise permanently affixed to the inwardly facing side of the continuous metal strip 41; therefore, the rubber piece 46 need be only slightly elastic, but should be considerably more compressible than the rubber piece 31 of the FIG. 4 embodiment, for reasons that will become apparent.

The embodiment of FIG. 6 does not utilize a tab-and-hole (slot) mechanism for maintaining the bait retaining member 45 around an earthworm positioned upon the saddle member 43. Rather, this embodiment utilizes the force of the metal strip 41 to urge the unitary rubber piece 46 against the earthworm to hold the earthworm in place. Those skilled in the art will therefore appreciate that the metal strip 41 should be made of a bendable or malleable metal that will remain in the position manually formed without returning to its pre-formed shape. In this manner, the fisherman may position an earthworm upon the saddle member 43 and manually bend the bait retaining member 45 downwardly to urge the bait gripping section 48 against the earthworm to hold same in place. The inventor has determined that tin and lead as metal strips 41 perform very well to hold a live earthworm in place. A spring steel strip also works very well as the metal strip 41 to retain an earthworm in position upon the saddle member 43.

Those skilled in the art will readily appreciate that the unitary rubber piece 46 of this FIG. 6 embodiment is preferably a foam rubber or other rubber material that is easily compressible, and that also possesses a surface that resist sheer slippage and is therefore suitable for gripping an earthworm and retaining same in position. This particular foam or similar rubber material should be used in the embodiment of FIG. 6 as the unitary rubber piece 46, regardless of whether the metal strip 41 is tin, lead, or spring steel.

FIG. 7 is a perspective view of a fifth embodiment 50 of the bait holder of the present invention. This embodiment is not attached to the fishhook shank 14, but rather, is readily attachable to a fishhook shank by the purchaser. As in all embodiments of the present invention, this embodiment comprises a saddle member 51 and a bait retaining member 52. The saddle member 51 comprises a base 53 which is made of a sheet steel or tin, folded into an open-ended enclosure. This is more clearly shown in FIG. 8. The saddle member base 53 defining the enclosure is filled with solder 55, such that the base may be readily and easily soldered onto a fishhook shank by heating the base until the solder flows, and then positioning the shank where desired within the open-ended enclosure, for instance, as shown in FIG. 8.

The saddle member 51 also comprises a bait gripping section 56 formed of a resilient material similar to that of the bait retaining straps of the embodiments of FIGS. 1–5. This embodiment, as in that of FIG. 4, incorporates a single unitary rubber piece 57 that forms both the saddle member bait gripping section 56 and the bait retaining strap 52. As shown, in this embodiment, the saddle member bait gripping section 56 is flat on two adjacent lower surfaces 58, 59, in order to conform to an engage mating surfaces of the saddle member base 53. Also as shown, the top portion of the saddle member bait gripping section 56 is formed in an arcuate shape for readily receiving and supporting an earthworm thereupon, as in all embodiments of the present invention.

The saddle member bait gripping section 56 of the unitary rubber piece 57 is bonded or otherwise permanently affixed to the saddle member base 53 using an adhesive that, of course, is heat-resistant, in order that the bait holder 50 may be soldered to a fishhook shank (and even unsoldered and resoldered a number of times) without breaking the adhesive bond therebetween. As can be appreciated, this bonding is effected between the two sets of mating flat surfaces at 58, 59 of the bait gripping section 56 and base 53.

The single unitary rubber piece 57 extends from the saddle member bait gripping section 56 to form the bait retaining strap 52 and handle 60, similar to the configuration of the embodiment of FIG. 4. The unitary piece 57 defining the retaining strap 52 also includes an attaching hole or slot 61 for manually positioning over (around) an attaching tab 62 formed as part of the saddle member metal base 53.

As in the embodiment of FIGS. 1–5, the unitary piece 57 is constructed of a resilient rubber of soft plastic material. Its inwardly facing surfaces define bait gripping surfaces 63 that function to grip onto an earthworm positioned within the bait holder. Operation of the FIG. 7 embodiment is, of course, the same as in the embodiments of FIGS. 1–5.

FIG. 9 illustrates a sixth embodiment 70 of the bait holder of the present invention. As in the FIG. 7 embodiment, this bait holder 70 is manually attachable to a fishhook shank 14 by the purchaser. Additionally, this embodiment is readily repeatedly removable and reattachable, simply by snapping it on and off of the shank.

This FIG. 90 embodiment is preferably constructed, essentially, of a single piece of molded resilient plastic 71 that is configured to "snap" onto the shank and remain in place by the compression action of opposed lips 72 that extend from the saddle member base 73. This is more clearly shown in FIG. 10.

Returning to FIG. 9, the bait holder 70 comprises (1) a saddle member 74, comprising the just-mentioned base 73 and a bait gripping section 75, and (2) a bait retaining member 76, comprising a support section 77 and a bait gripping section 78. As shown, the bait retaining member support section 77 is an extension of the saddle member base 73, both formed of the unitary piece of molded plastic 71.

The bait retaining member support section 77 includes a three-dimensional hook 79 that is adapted to be inserted into a mating latch 80 to form a closed loop around an earthworm. The latch includes a release tab 81, by which the hook 79 may be manually released by pressing down on the tab.

When the hook 79 is hooked into the latch 80, the saddle member 74 and bait retaining member 76 define a closed (closable) loop of a definite size around a worm. Because the closable loop is always the same size, and because the molded plastic piece 71 will not stretch or otherwise conform to different worm diameters, the two bait gripping sections 75, 78 are constructed of a readily compressible foam rubber material, similar to the single rubber piece 46 of the embodiment of FIG. 6. This soft foam rubber material will compress to accommodate a range of large earthworm diameters, while being sufficiently thick and resilient to "flow" to occupy any slack or free space around small earthworms. As in the previous embodiments, both bait gripping sections 75, 78 have bait gripping surfaces to engage and retain an earthworm positioned within the bait holder.

Use of the FIG. 9 embodiment is slightly different from those of the other embodiments, but still should be obvious from the drawing and description. An earthworm is positioned upon the saddle member bait gripping section 75, and the bait retaining member is simply pushed down sufficiently to latch the hook 79 into the latch 80. As previously described, the bait gripping sections 75, 78 will compress in order to avoid squeezing the worm.

When the user desires to "rebait" the hook, he simply presses down on the latch release tab 81 to release the hook 79. The molded plastic material will spring back into the position shown in FIG. 9 to enable the user to position another earthworm within the bait holder.

From the foregoing it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

The invention having been described, what is claimed is:

1. A bait holder for retaining live bait therein, said bait holder being connectable to fishing hooks of the type having a solid, elongated shank, said bait holder comprising:
   (a) a saddle member connectable to the fish hook shank, said saddle member having a support section, and a bait gripping section formed of a material having a friction gripping surface for frictionally gripping onto an item of live bait without puncturing or physically injuring the live bait, said bait gripping section being affixed to said support section;
   (b) a bait retaining member having a bait gripping section formed of a material having a friction gripping surface for frictionally gripping onto the item of live bait without puncturing or physically injuring the live bait, said bait retaining member being manually attachable to said saddle member to define a closable loop; and (c) a tab on said saddle member manually insertable into means defining a hole in said bait retaining member for removably connecting said bait retaining member to said saddle member in a manner to define said closable loop around the live bait positioned upon said saddle member.

2. A bait holder according to claim 1 wherein said material having a friction gripping surface is resilient.

3. A bait holder according to claim 1 wherein said saddle member bait gripping section and friction retaining member bait gripping section are integrally formed of a single piece of material having a bait gripping surface.

4. A bait holder according to claim 1 wherein said bait retaining member further comprises a support section integrally formed with said saddle member support section, and wherein said bait gripping section is affixed to said support section.

5. A combination fishing hook and bait holder for retaining live bait therein, comprising:
(a) a fishing hook having a solid, elongated shank;
(b) a saddle member mounted to said shank, said saddle member having support section and a bait gripping section formed of a material having a friction gripping surface for frictionally gripping onto an item of live bait without puncturing or physically injuring the live bait, said bait gripping section being affixed to said support section;
(c) a bait retaining member having a bait gripping section formed of a material having a friction gripping surface for frictionally gripping onto the item of live bait without puncturing or physically injuring the live bait; and
(d) a tab on said saddle member manually insertable into means defining a hole in said bait retaining member for removably connecting said bait retaining member to said saddle member in a manner to define a closable loop around the live bait positioned upon said saddle member.

6. A combination fishing hook and bait holder according to claim 5 wherein said material having a friction gripping surface is resilient.

7. A combination fishing hook and bait older according to claim 5 wherein said saddle member bait gripping section and bait retaining member bait gripping section are integrally formed of a single piece of material having a friction gripping surface.

8. A combination fishing hook and bait holder according to claim 5 wherein said bait retaining member further includes a support section, and wherein said saddle member support section and said bait retaining member support section are integrally formed of a unitary bendable metal strip.

9. A combination fishing hook and bait holder according to claim 8 wherein said saddle member bait gripping section and bait retaining member bait gripping section are integrally formed of a single piece of material having a friction gripping surface.

10. A combination fishing hook and bait holder according to claim 9 wherein said bendable metal strip is tin.

11. A combination fishing hook and bait holder according to claim 9 wherein said bendable metal strip is lead.

12. A combination fishing hook and bait holder according to claim 9 wherein said bendable metal strip is spring steel.

13. A bait holder for retaining live bait therein, said bait holder being connectable to fishing hooks of the type having a solid, elongated shank, said bait holder comprising:
(c) a saddle member connectable to the fish hook shank, said saddle member having a support section, and a bait gripping section formed of a material having a friction gripping surface for frictionally gripping onto an item of live bait without puncturing or physically injuring the live bait, said bait gripping section being affixed to said support section;
(b) a bait retaining member having a flexible support section integrally formed with said saddle member support section, a bait gripping section affixed to said support section formed of a material having a friction gripping surface for frictionally gripping onto the item of live bait without puncturing or physically injuring the live bait, said bait retaining member being manually attachable to said saddle member to define a closable loop; and
(c) a hook and latch mechanism for removably connecting said bait retaining member to said saddle member in a manner to define said closable loop around the live bait positioned upon said saddle member, wherein said saddle member bait gripping section and said bait retaining member bait gripping section are integrally formed of a single piece of material having a friction gripping surface.

14. A combination fishing hook and bait holder for retaining live bait therein, comprising:
(a) a fishing hook having a solid, elongated shank;
(b) a saddle member mounted to said shank, said saddle member having a support section and a bait gripping section formed of a material having a friction gripping surface for frictionally gripping onto an item of live bait without puncturing or physically injuring the live bait, said bait gripping section being affixed to said support section;
(c) a bait retaining member attachable to said saddle member, said bait retaining member being formed of a material having a friction gripping surface for frictionally gripping onto the item of live bait without puncturing or physically injuring the live bait; and
(d) a tab on said saddle member manually insertable into means defining a hole in said bait retaining member for removably connecting said bait retaining member to said saddle member in a manner to define said closable loop around the live bait positioned upon said saddle member.

* * * * *

UNITED STATES PATENT AND TRADEMARK OFFICE
CERTIFICATE OF CORRECTION

PATENT NO. : 4,947,575

DATED : August 14, 1990

INVENTOR(S) : Nich A. Yerkovich

It is certified that error appears in the above-identified patent and that said Letters Patent is hereby corrected as shown below:

In column 7, line 15, "friction" should be --bait--;

In column 7, line 17, "bait" should be --friction--;

In column 7, line 28, insert --a-- after "having";

In column 7, line 48, "older" should be --holder--; and

In column 8, line 16, "(c)" should be --(a)--.

Signed and Sealed this

Thirty-first Day of March, 1992

Attest:

HARRY F. MANBECK, JR.

*Attesting Officer*     *Commissioner of Patents and Trademarks*